June 19, 1934.  A. F. MEYER  1,963,371
APPARATUS FOR CONTROLLING MECHANISMS
Filed Feb. 21, 1927  3 Sheets-Sheet 3

INVENTOR
ADOLPH F. MEYER
By Paul, Paul & Moore
ATTORNEYS

Patented June 19, 1934

1,963,371

UNITED STATES PATENT OFFICE 1,963,371

APPARATUS FOR CONTROLLING MECHANISMS

Adolph F. Meyer, St. Paul, Minn.

Application February 21, 1927, Serial No. 170,041

13 Claims. (Cl. 171—119)

This invention relates to new and useful improvements in controlling mechanisms particularly adapted for use in a control system for a plurality of units whose functions are to be controlled or regulated. The mechanism is peculiarly adapted for use in automatically and cynchronously controlling units, or, in controlling indirectly such units, by means of interposed regulators. The invention is also adapted for use in what may be termed remote control of indicators or gauges displaying or recording different phenomena such as water levels, positions of hydraulic gates, machine operation, pressures, etc.

The adaption of this invention as used in the control of a number of electrical units is shown in the drawings, and in this specific form the invention functions to maintain substantially constant the sum total of power consumed by a plurality of electrical units. These electrical units may consume electrical power in the form of heat such as electric furnaces, or in the form of light such as lighting equipment, or in the form of motion such as motors. The last mentioned form is diagrammatically indicated in the drawings in which some of the motors are driving grinders for making wood pulp. In this typical installation several of the motors may operate other machinery for which it is desired to maintain a full supply of electrical energy for the work to be done, but which work may vary in its demands for electrical energy from the electric supply line. In order to keep constant the sum total of the power consumed by all these units, the wood pulp grinder loads are automatically controlled by means of this novel invention, which adjusts automatically the grinder-loads responsively to any variation from the desired constant sum total of power consumed by all the units in the particular circuit.

The object of the invention therefore is to provide an approved method of an apparatus or system for controlling mechanisms, and other objects of the invention will more fully appear from the following description and the accompanying drawings and will be pointed out in the annexed claims.

In the accompanying drawings there has been disclosed a structure designed to carry out the object of the invention but it is to be understood that the invention is not confined to the exact features shown as various changes may be made within the scope of the claims which follow.

In the drawings forming part of this specification;

Figure 1:
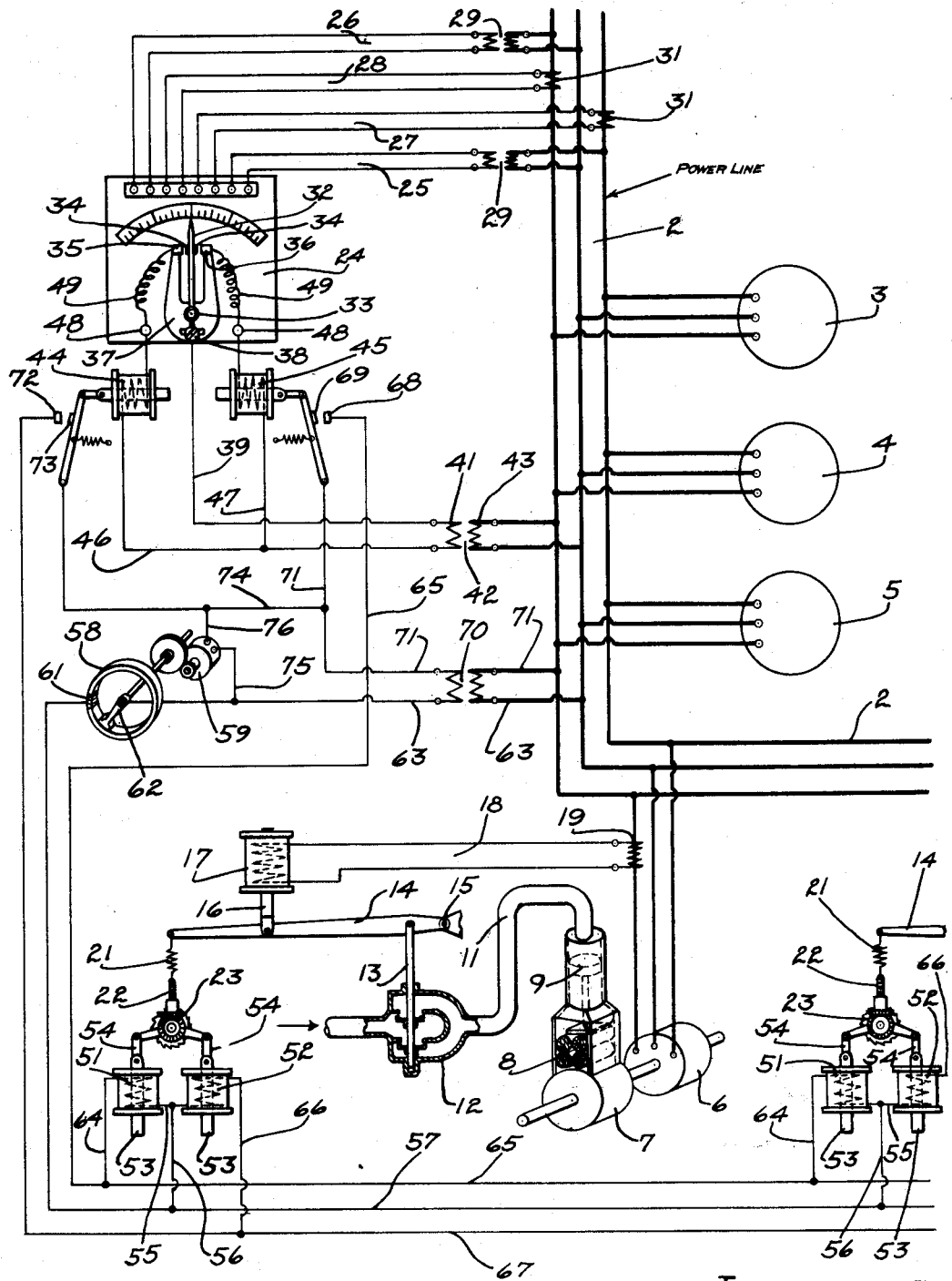
Figure 1 is a diagrammatic view of a method and apparatus for controlling pulp and paper mill mechanisms.

In the installation diagrammatically disclosed in Figure 1, for purpose of explanation of this invention, there is shown a three-wire power line 2. Several power-consuming units such as the electric motors 3, 4 and 5 are shown connected in parallel to the power line. These motors may be considered as driving machinery used in a paper mill. Only one of the motors 6 driving a grinder 7 is shown, but it is to be understood that a plurality of such grinders are commonly used in pulp and paper mills. These are used for the production of wood pulp consumed in the manufacture of paper. In paper mill operation the power consumed by the grinder motors may permissibly vary but it is highly advantageous to have a constant and ample supply of power for the motors driving other machines coincident with the useful consumption of all the available power. Hence, when any one or more of the motors 3 to 5 is not working at full load, the unused electrical energy may advantageously be employed in useful work by the grinder motors 6, of which it is to be understood there are usually a plurality, although one only is diagrammatically represented here.

It is common in this art for each grinder to have several associated pockets, only one of which is shown, to contain the wood which is pressed by a piston against the surface of the grinder. In Figure 1 there has been diagrammatically represented such a pocket 8 and a piston 9 to which water is supplied by the pipe 11 in which is interposed a valve to govern the water pressure admitted to the piston. The balanced type of pressure reducing valve 12 here shown is provided with a stem 13 pivotally connected to a lever 14. The lever 14 is pivotally mounted on a pin 15 carried by a suitable support and outwardly projects where it is intermediately pivotally connected to a core 16 of a solenoid 17, having wires 18 for its electrical energization, whereby the position of the core is varied, which in turn changes the position of the balanced valve 12. The solenoid is energized by the induced current set up in the wires 18 which are inductively associated by a winding 19 with one of the three feed wires connecting the grinder motor 6 with the power line 2. The result is that the solenoid is energized in direct proportion to the power consumption of the grinder motor 6. The opposite end of the lever 14 has one end of a tension spring 21 terminally connected thereto, the other end of which is connected to an adjusting screw or stem 22 movably connected with a mechanism 23. This mechanism will subsequently be described in detail. The mechanism 23 functions to automatically adjust the tension of the spring 21 to control the opening and closing of the valve 12, regulating the water pressure on the piston 9 of the grinder 7, and the operation of this mechanism 23 is automatically controlled by the load variation in the power line 2.

A watt meter 24 of ordinary construction, is electrically associated with the power line 2 by means of circuits 25, 26, 27, and 28. Potential transformers 29 are interposed in the circuits 25 and 26 and current transformers 31 inductively connect the circuits 27 and 28 with the power line 2. The watt meter 24 is provided with the usual pointer 32, pivotally mounted at 33. Contacts 34 are provided upon the pointer 32 and are adapted to move with the pointer into and out of engagement with a pair of contacts 35 and 36, carried by a supporting member 37 also pivotally mounted at 33 and secured in adjusted positions by means of a screw 38. A wire 39 electrically connects the pointer 32 with the secondary 41 of a transformer 42. The primary 43 of this transformer is electrically connected with the power line as shown. The purpose of the transformer 42 is to step down the high voltage of the power line so that a low voltage circuit is provided to operate a pair of solenoids 44 and 45. The solenoid 44 has a wire 46 connecting it with the other side of the secondary 41 of the transformer and a wire 47 connects the solenoid 45 with the wire 46. The solenoids 44 and 45 are also connected respectively to a pair of terminals 48 having pig tail connections 49 with the adjustable contacts 35 and 36. From the foregoing, therefore, it will readily be noted that the two solenoid circuits are provided, and the opening and closing of these circuits is controlled by the movement of the indicating finger or pointer 32 of the watt meter 24.

The solenoids 44 and 45 control the closing of the electrical circuits effecting the operation of the mechanisms 23. Each mechanism 23 is operatively connected to a pair of solenoids 51 and 52, each having a plunger 53 having link connections 54 with the mechanism 23, as shown in Figure 1. The solenoids for each mechanism 23 are adapted to be operated independently of each other. For example, when the solenoid 51 is operated, the mechanism 23 may be actuated to move the adjusting screw 22 in a direction to decrease the tension of the spring 21 and, conversely, when the solenoid 52 is operated, the mechanism may be actuated to move the adjusting screw 22 in a direction to increase the tension of the spring 21. The actuation of the mechanism 23 is therefore controlled by the energization of the solenoids 51 and 52.

The windings of each pair of solenoids 51 and 52 are connected together by means of wires 55, each having a wire 56 connecting it with a conductor 57 having one end electrically connected to a circuit-breaker 58, operable by a small motor 59. The circuit-breaker 58 has a contact 61 adapted to be engaged by an arm or movable contact 62 having a wire 63 electrically connecting it with the power line 2. Wires 64 connect the solenoids 51 with a conductor 65 and similar wires 66 connect the solenoids 52 with a conductor 67. The conductor 65 has one end connected to a contact post 68 adapted to be electrically engaged by a movable contact 69 having a wire 71 connecting it with one of the conductors of the power line 2. This movable contact 69 is operable by the solenoid 45. The wire 67 is similarly connected to a stationary contact 72, likewise adapted to be engaged by a movable contact 73 adapted to be operated by the solenoid 44. A wire 74 connects the movable contact 73 with the wire 71. The current-breaker motor 59 is electrically connected with the wires 63 and 71 by means of wires 75, and 76, and 74. A potential transformer 70 is preferably interposed in the wires 63 and 71 to reduce the voltage in the solenoid circuits. Thus, when current is flowing through the power line 2, the motor 59 will be continuously operated to rotate the circuit-breaker arm 62, so that each time one of these solenoid circuits is closed through one of the movable contacts 69 or 73, such circuit will be alternately opened and closed to actuate the operating mechanisms 23.

The operation of the installation, diagrammatically illustrated in Figure 1, is as follows: when the pointer 32 of the watt meter is actuated by load variations of the power line 2, it will be moved into electrical connection with one of the contacts 35 or 36. Assuming that the contact 35 indicates the low reading on the meter and the contact 36, the high reading on the meter 24, then as the load in the power line 2 is increased, the wire 32 will be moved into electrical connection with the contact 36, thereby closing a circuit through the solenoid 45, with the resultant moving of the movable contact 69 into electrical connection with the stationary contact 68, thereby closing a circuit to the solenoids 51 of the operating mechanisms 23. This circuit is as follows: from one of the conductors of the power line 2 through the wire 71, movable contact 69, stationary contact 68, conductor 65, wires 64 through the windings of the solenoids 51, wires 55 and 56; thence to the conductor 57, circuit-breaker contacts 61 and 62, and wire 63, back to the power line 2. As soon as the contacts 68 and 69 are thus moved into electrical connection with each other, the motor 59, which is running continuously, will cause the rotating arm 62 of the circuit-breaker to open and close the circuit supplying current to the solenoids 51, as a result of its continuously making and breaking its connection with the contact 61. Such intermittent energization of the solenoids 51 will cause the plungers 53 thereof to be reciprocated therein to automatically, simultaneously actuate all of the mechanisms 23 connected in the circuit to decrease the tension in the spring 21, thereby causing the valves 12 to be operated to reduce the water pressure on pistons 9 and thus to decrease the load on the grinders.

Conversely, when the load in the power line decreases, the pointer or finger 32 will be moved into electrical connection with the contact 35, thereby energizing the low voltage solenoid 44 and causing the latter to move the contact 73 into electrical connection with the stationary contact 72 with the resultant energization of the solenoids 52 which will cause the mechanisms 23 to be actuated to increase the tension in the springs 21 with the resultant opening of the valves 12 to increase the load on the grinders 7. The circuit for the solenoids 52 is as follows; from the power line through the wires 71 and 74, movable contact 73, stationary contact 72, conductors 67, wires 66 to the solenoids 52; thence through the common wires 55 and 56, conductor 57, through the circuit-breaker 58 and wire 63, back to the power line 2. Thus, it will be noted that as the load on the power line varies, the pointer or finger 32 of the watt meter 34 will alternately move into and out of engagement with the stationary contacts 35 and 36, thereby causing the automatic operation of the mechanisms 23 to simultaneously regulate the flow of water to all of the grinders in the grinder room. By means of the adjusting screw 38, the contacts 35 and 36 may be adjusted to any desired reading upon the watt meter 24.

Figure 2:
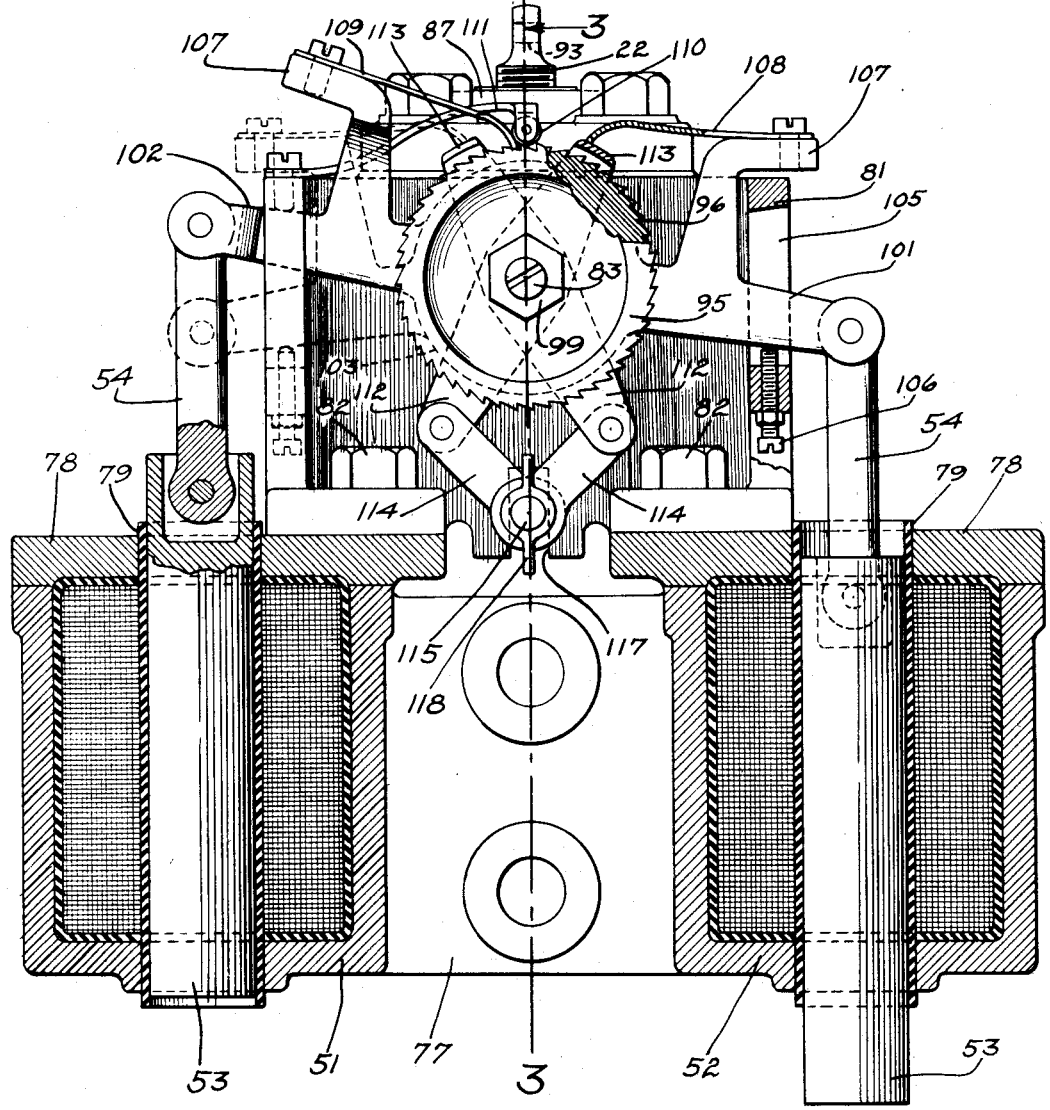
Figure 2 is a front elevation, partially in section, of one of the control devices.
Figure 3:
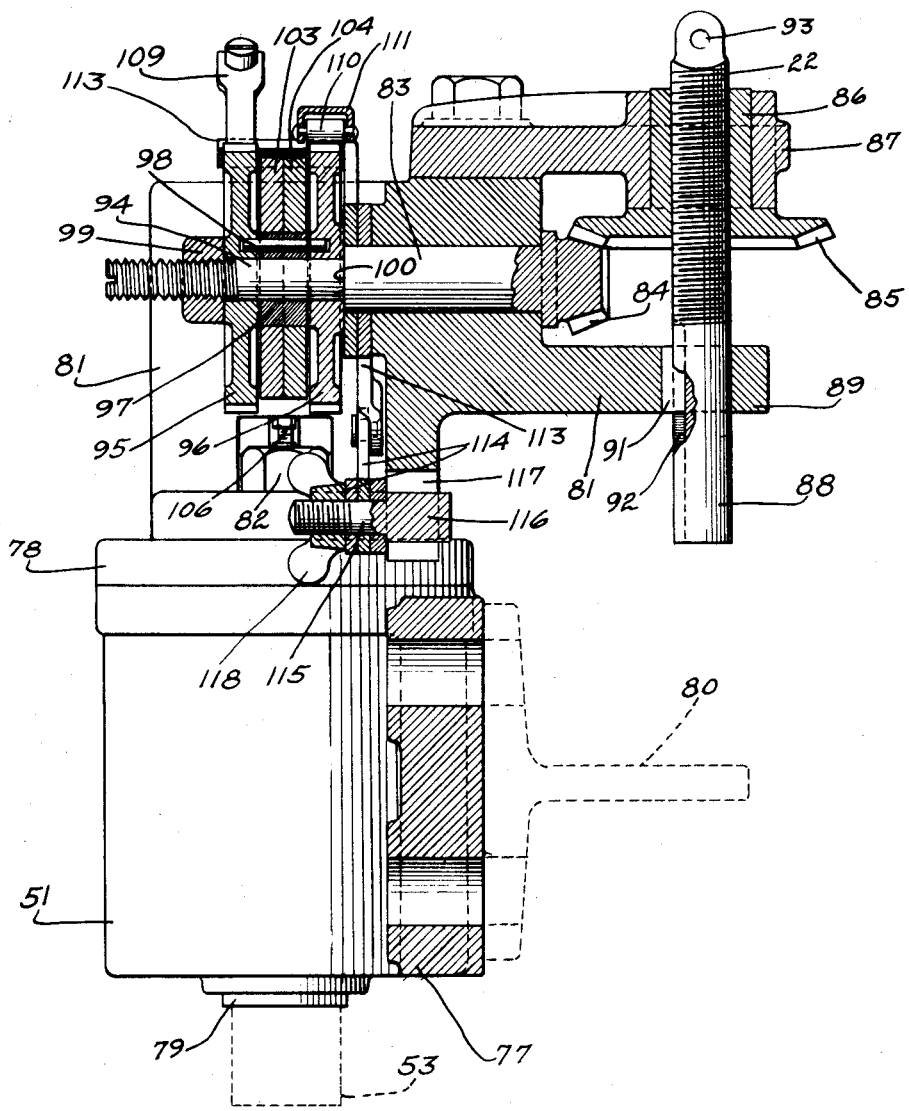
Figure 3 is a vertical sectional view on the line 3—3 of Figure 2.

The control mechanism 23 is shown in detail in Figures 2 and 3. Each mechanism preferably comprises a suitable frame 77 in which the windings of the solenoids 51 and 52 are mounted. Cover plates 78 are suitably secured to the upper portion of the frame 77 to provide closures for the windings of the solenoids 51 and 52. The plungers 53 are reciprocally mounted in the windings of the solenoids and are insulated therefrom as by insulating sleeves 79, shown in Figure 2. The frame 77 is apertured whereby it may be secured to a suitable support 80, shown in dotted lines in Figure 3.

A bracket 81 is mounted upon the cover plates 78 by such means as bolts or cap screws 82, and in this bracket there is mounted a shaft 83 having a bevel pinion 84 terminally provided thereon, as shown in Figure 3. This pinion 84 meshes with a bevel gear 85 having an integral sleeve 86 rotatably mounted in a bearing 87, preferably demountably secured to the upper portion of the bracket 81, as shown. The sleeve 86 is integrally threaded to receive the adjusting screw or stem 22, which preferably has its lower end portion 88 slidably mounted in a guide 89, having a key 91 secured therein, which is engageable with a key way 92 in the lower portion of the stem 88 to prevent the latter from relatively rotating, when the gear 85 is rotated. The sleeve 86 of the gear 85 is internally threaded to receive the threaded stem 22 so that when the gear is rotated, the stem 22 will be vertically moved therein with respect to the bracket 81. The stem 22 is provided at its upper end with an eye 93 to provide means for connecting the spring 21 thereto.

The shaft 83 has a reduced end portion 94 upon which is mounted right and left hand ratchet wheels 95 and 96, respectively, spaced apart by means of a spacing collar or sleeve 97, as shown in Figure 3. A pin 98 is preferably mounted in the collar 97 and has its end portions terminally received in sockets provided in the hubs of the ratchet wheels 95 and 96, and its function is to prevent the ratchet wheels from relatively rotating with respect to each other. A nut 99 is received in threaded engagement with the outer end portion of the reduced portion 94 of the shaft 83 and functions to securely clamp the ratchet wheels 95 and 96 against the shoulder 100 for rotation with the shaft as a unit.

The means provided for actuating the ratchet wheels 95 and 96 is shown in Figure 2, and consists of a pair of arms 101 and 102, each having a connection with one of the links 54, connected with the plungers 53 of the solenoids 51 and 52. The arms 101 and 102 each have a flat-like hub 103 and 104, respectively, which are bored to receive the spacing collar or sleeve 97 as shown in Figure 3. The hubs 103 and 104 are loosely mounted upon the collar 97 so that the arms 101 and 102 may be oscillated as shown in full and dotted lines in Figure 2. The arms 101 and 102 pass through openings 105 provided in the bracket 81 and their downward movement is controlled by means of adjusting screws 106, shown in Figure 2. Extensions 107 are provided on the arms 101 and 102 and have secured thereto a pair of flexible ratchet-operating members 108 and 109, which are adapted to be moved into and out of driving engagement with the ratchet wheels to intermittently rotate them in one direction or the other, depending upon which solenoid is energized. Suitable means, such as a stop roller 110 is provided to retain the ratchet wheels in their adjusted positions. This stop roller is adapted to engage one of the ratchet wheels and rides on the teeth thereof so that for each intermittent movement of the ratchet wheels they will come to rest with their teeth bearing a fixed relation with respect to the frame 81. The roller 110 is terminally supported upon a flexible arm 111 which must slightly flex for each movement of the ratchet wheel, that is, each time the ratchet wheel is moved one tooth, the roller 110 is moved upwardly against the tension of the arm 111. Such movement of the roller 110 will therefore cause the ratchet wheel to be positively held with their teeth in fixed relation to the frame 81 for each intermittent actuation thereof.

Means are provided for relatively adjusting the stroke or intermittent movement of each ratchet wheel for each movement of the arms 101 and 102. Such a means is shown in Figure 2 and consists of a pair of L-shaped elements 112 pivotally mounted upon the shaft 83 and each having an off-set end portion 113 overhanging the ratchet wheels 95 and 96 in the paths of the flexible members 108 and 109. The lower ends of the elements 112 are pivotally connected to links 114 having their lower ends traversed by a clamping screw 115, having a squared head 116 movably mounted in an open ended slot 117 provided in the lower portion of the frame 81. A wing nut 118 is received in threaded engagement with the clamping screw 115 and provides means for locking the elements 112 in their adjusted positions. When the elements 112 are in the positions shown in Figure 2, it will be noted that the ratchet driving members 108 and 109 will be moved into engagement with the off-set end portions 113 and will be moved out of engagement with the ratchet teeth upon the down stroke of the arms 101 and 102.

In Figure 2, let it be understood that the solenoid 52 is de-energized, in which case, the plunger 53 will be in its downward position and the arm 101 will be resting upon the adjusting screw 106. It will also be noted that when the arm 101 is thus positioned, the ratchet driving member 108 will be out of engagement with the ratchet 96, as a result of having engaged the off-set end portion 113 of one of the elements 112. On the left hand side of Figure 2, it will be noted that the plunger 53 has been moved upwardly as a result of the solenoid 51 having been energized. Such upward movement of the solenoid will move the arm 102 upwardly, causing the ratchet driving member 109 to be moved out of engagement with the off-set end portion 113 and into driving engagement with the ratchet 95. When the arm 102 is moved downwardly by the gravitational drop of the plunger 53, as a result of the solenoid 51 being momentarily de-energized by the circuit-breaker 58, the ratchet driving member 109 will slide backwardly over the ratchet teeth and into engagement with the member 113 to the dotted line position shown on the left hand side of Figure 2. It will therefore, be seen that for each complete upward and downward movement of the arm 102, the ratchet wheel 95 will be rotated in a clockwise rotation and will transmit a similar movement to the shaft 83, operatively connected with the adjusting screw or stem 22 by the pinion 84 and gear 85. In Figure 2, the feed adjusting members 112 are shown positioned so that the ratchet driving members 108 and 109 will rotate the ratchet wheels one tooth for each stroke of the arms 101 or 102. To increase the rotation of the ratchet wheels per stroke of the arms 101 and 102, the clamping screw 115 is moved upwardly, thereby spreading apart the two off-set end portions 113 of the elements 112, causing the ratchet driving members 108 and 109 to rotate the ratchet wheels two teeth for each stroke of the arms 101 or 102, thus increasing the rotation of the shaft 83 per stroke of the arms 101 and 102. The off-set end portions 113 also function to hold the ratchet driving members 108 and 109 out of engagement with the ratchet wheels when the solenoids 51 and 52 are de-energized or in inoperative positions. Thus, the ratchet driving members will be operated independently of each other to selectively rotate the shaft 83 in either direction, depending upon the tension required in the spring 21. The reduced end portion 94 of the shaft 83 is terminally slotted to receive a screwdriver or other instrument whereby the mechanisms 23 may be manually adjusted independently of each other.

From the foregoing, therefore, it will readily be understood that by the employment of the above described mechanism in connection with a motor-load actuated pressure reducing valve 12, the water pressure on the pistons 9 will be automatically controlled by the operation of the watt meter 24. It will also be seen that by operating two or more grinders from the power line 2, and that by providing each of the regulating valves for the respective grinders with a mechanism 23, such as above described, that all of the valves will be automatically and simultaneously regulated by the operation of the watt meter 24 which may be located a considerable distance therefrom. The above described mechanism and apparatus is therefore, well adapted for remote control of indicators or gages, displaying or recording different phenomena such as water levels, positions of hydraulic gates, machine operations, pressures, etc.

I claim as my invention:

1. In a control system for a plurality of units each including a device to be operated, there being controlled and uncontrolled units in said system, a regulator for each controlled unit including mechanism for altering the magnitude of the force opposing the device to be operated of the corresponding unit, and means for automatically adjusting said mechanisms, said means being controlled by variation of the power consumed by all of said units.

2. In a control system for a plurality of units each operating a load, regulators for certain of said units, each of said regulators including a load-opposing mechanism, and said load-opposing mechanisms being adapted to maintain any desired operative effect upon each of said certain units, and means for automatically adjusting said load-opposing mechanisms of said regulators, said means being responsive in its operation to the total power consumed by all of said units.

3. In a control system for a plurality of power consuming units, including certain units each having a motor and a load operated thereby, regulators for said certain units, each of said regulators including a load-opposing mechanism, and all of said load-opposing mechanisms being adapted to maintain any desired power consumption on said certain units, and means for automatically adjusting said load-opposing mechanisms of said regulators to maintain substantially constant the sum total of the power consumed by all of said units.

4. In a control system for a plurality of power consuming units, including certain units each having a motor and a load operated thereby, regulators adjustable by means of load-opposing springs for maintaining any desired power consumption on said certain units, and means for automatically adjusting the tension of the load-opposing springs of said regulators to maintain substantially constant the sum total of the power consumed by all of said units.

5. In combination, a source of electrical energy, a supply circuit connected thereto, a plurality of regulated load devices connected to said circuit, a plurality of unregulated load devices connected to said circuit, said regulated load devices having associated therewith individual load regulators, movable load adjusting means associated with each of said regulators, a master power responsive means associated with said circuit, said means having an element which is movable in response to variations in the power flow through said circuit, and telemetric means connecting said movable element and said movable load adjusting means.

6. In combination, a source of alternating current electrical energy, a supply circuit connected thereto, load devices, including a plurality of motor operated load devices connected to said circuit, individual load regulators associated with each of said motor operated load devices, manually operable means for individually adjusting the loads maintained by each of said regulators, and means including telemetric devices for simultaneously operating all of said adjusting means in response to variations in the total amount of power required by all of said load devices in such a manner as to tend to maintain said power constant.

7. In a control system for a plurality of power consuming units, including electric torque devices, regulators for adjustably maintaining any desired power consumption of certain of said electric torque devices, and separate means for automatically adjusting certain of said regulators whereby to maintain substantially constant the sum total of the power consumed by all of said units.

8. In a control system for a plurality of power consuming units, including electric torque devices, regulators for adjustably maintaining any desired power consumption of certain of said electric torque devices, and remote control means for automatically and synchronously adjusting certain of said regulators whereby to maintain substantially constant the sum total of the power consumed by all of said units.

9. In a control system for a plurality of units, each including a device to be operated, regulators for certain of said units, each regulator including a solenoid whose pull varies with the load of the device to be operated, and mechanism opposing such pull, and means, including said mechanism, for automatically changing the power consumption of the device to be operated of the corresponding unit, responsively to any variation from the desired constant sum total of power consumed by all of the units of said system.

10. In a control system for a plurality of units, each including a device to be operated, regulators for certain of said units, each regulator including a solenoid whose pull varies with the load of the device to be operated, and a spring opposing such pull, and means, including said spring, for automatically changing the power consumption of the device to be operated of the corresponding unit, responsively to any variation from the desired constant sum total of power consumed by all the units of said system.

11. In a control system for a plurality of units, each including a device to be operated, regulators for certain of said units, each regulator including mechanism standing in constant functional relationship with the load of the device to be operated and mechanism standing opposed thereto, and means, including said mechanism, for automatically and synchronously changing the power consumption of the devices to be operated of the corresponding units, responsively to any variation from the desired constant sum total of power consumed by all of the units of said system.

12. In a control system for a plurality of units each including a device to be operated, regulators for certain of said units, each regulator including mechanism standing in constant functional relationship with the load of the device to be operated and a spring standing opposed thereto, and means, including said spring, for automatically changing the power consumption of the device to be operated of the corresponding unit responsively to any variation from the desired constant sum total of power consumed by all of the units of said system.

13. In combination, a source of electrical energy, a supply circuit connected thereto, a plurality of regulated load devices connected to said circuit, a plurality of unregulated load devices connected to said circuit, said regulated load devices having associated therewith individual load regulators, movable load adjusting means associated with each of said regulators, a master power responsive means associated with said circuit, said means having an element which is movable in response to variations in the power flow through said circuit, and remote control means connecting said movable element and said movable load adjusting means.

ADOLPH F. MEYER.